Patented July 19, 1932

1,867,962

UNITED STATES PATENT OFFICE

LEONARD JAMES ALLCHIN, OF BLACKLEY, MANCHESTER, ENGLAND, ASSIGNOR TO IMPERIAL CHEMICAL INDUSTRIES LIMITED, OF WESTMINSTER, ENGLAND

MANUFACTURE OF M-2-XYLIDINE

No Drawing. Application filed March 13, 1930, Serial No. 435,628, and in Great Britain April 11, 1929.

This invention relates to the manufacture of xylidines and comprises improved methods for the separation of m-2-xylidine (vicinal m-xylidine) from mixtures of the isomeric xylidines, by which the tedious fractional crystallizations necessary in hitherto known methods of separation are avoided.

The oil remaining after the removal of the bulk of the para- and asym. meta xylidines by the usual processes from the reduction product of crude nitroxylenes contains in varying proportions all the isomeric xylidines. I have found that by dissolving this residual oil in moderately concentrated hydrochloric acid and adding to the hot solution the chloride of a metal of Group IIb of the Periodic System, e. g. zinc chloride, we obtain on cooling a crystalline precipitate containing in the form of double salt practically the whole of the m-2-xylidine free from isomerides.

My invention is illustrated but not limited by the following example, in which the parts are by weight.

*Example.*—80 litres of the residual oil remaining after removal of the bulk of the para- and asym. meta-xylidines from the crude xylidine oil are dissolved in 120 litres of 36 per cent hydrochloric acid and 40 litres of water. The solution is heated to 90° C. and there are added 90 kilograms of powdered zinc chloride. Alternatively part of the acid or water specified may be used to dissolve the zinc chloride and the latter added in the form of solution. On standing for some hours a crystalline precipitate of double salt separates out. This is filtered off and washed free from adhering mother-liquor.

The crystals are now basified by the addition of an alkali, which may be just sufficient to decompose the double salt and set free the base, or may be added in excess. The m-2-xylidine is then distilled off in steam.

Having now particularly described and ascertained the nature of my said invention and in what manner the same is to be performed, I declare that what I claim is:—

1. Process for the manufacture of m-2-xylidine from the residual mixture of isomerides technically obtained in removing the bulk of such isomerides from the reduction product of crude nitroxylenes which consists in treating this mixture with hydrochloric acid and zinc chloride in hot solution, cooling the solution, removing the double salt of m-2-xylidine which crystallizes, and liberating the m-2-xylidine by treating this salt with alkali.

2. In the preparation of m-2-xylidine the process which comprises dissolving material containing the same in aqueous hydrochloric acid, adding zinc chloride and isolating the crystallized double salt resulting.

In testimony whereof I affix my signature.

LEONARD JAMES ALLCHIN.